Jan. 11, 1944.    N. S. REYNOLDS    2,338,873
DIAPHRAGM SEAL
Filed Sept. 2, 1941
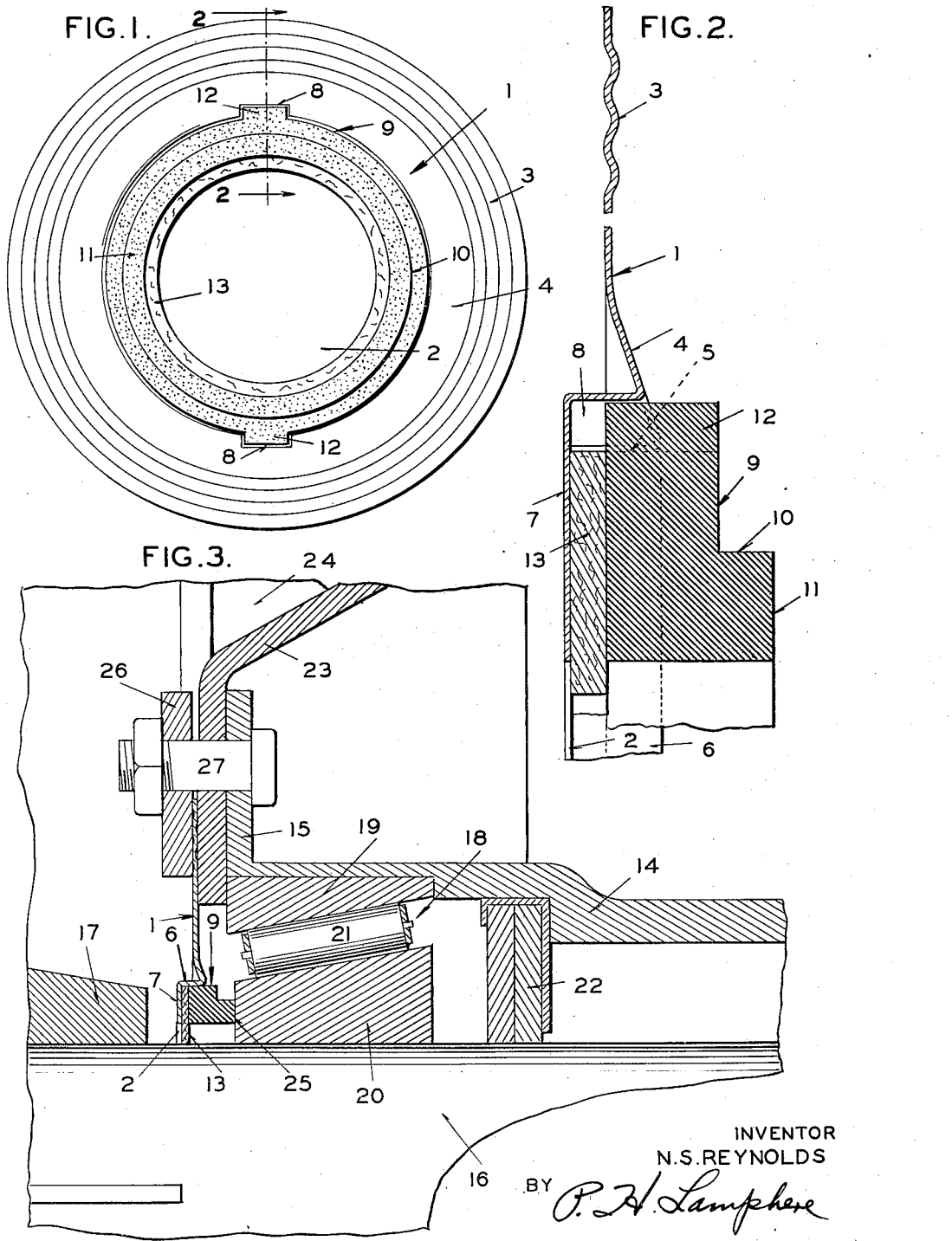
INVENTOR
N. S. REYNOLDS
BY P. H. Lamphere
ATTORNEY Patented Jan. 11, 1944

2,338,873

UNITED STATES PATENT OFFICE 2,338,873

DIAPHRAGM SEAL

Noel S. Reynolds, St. Louis, Mo.

Application September 2, 1941, Serial No. 409,237

2 Claims. (Cl. 286—11)

My invention relates to seals and more particularly to seals of the diaphragm type and wherein the cooperating sealing surfaces are at substantially right angles to the axis of rotation of the relatively rotatable members requiring sealing.

One of the objects of my invention is to produce an improved diaphragm seal having a sealing ring of carbon material such as, for example, graphite.

Another object of my invention is to associate means with a diaphragm seal which will cause the seal to be held in a proper position while being assembled.

Still another object is to produce an improved seal in which the sealing action against passage of lubricant is obtained by cooperating surfaces positioned at substantially right angles to the axis of rotation of the relatively rotatable members being sealed and with which there is provided a washer of suitable non-metallic material carried by the seal for engagement with the cylindrical surface of the rotating member to seal against dust and foreign material.

Another object of my invention is to provide improved means for attaching a sealing ring to a diaphragm.

Other objects of my invention will become apparent from the following description taken in connection with the accompanying drawing in which Figure 1 is a view of my improved seal as viewed from an axial direction; Figure 2 is an enlarged sectional view taken on the line 2—2 of Figure 1; and Figure 3 is a sectional view showing the seal mounted in an operative position for sealing a vehicle rear axle construction.

Referring to the drawing in detail and particularly Figures 1 and 2, numeral 1 indicates an annular imperforate metal disc or diaphragm having an opening 2 at its center and provided with concentric strengthening corrugations 3 beginning adjacent the periphery and extending inwardly about half the radial width of the disc. Inwardly of these corrugations the disc is flared as indicated at 4 and then so shaped as to provide an annular recess 5 having a cylindrical wall 6 and a wall 7 at right angles thereto. Within the wall 6 are formed two diametrically positioned pockets 8. This disc or diaphragm, as described, is all made from a single piece of thin metal which may be brass, bronze or other alloy. The metal may be from six to eight thousandths of an inch thick and has such resiliency as to be capable of a certain degree of flexing without deformation.

Positioned in recess 5 is a sealing ring 9 preferably made from a carbon material such as graphite although other suitable material may be used. It is desirable, however, that this material have a lubricating characteristic in order that the surface which it is to contact will be lubricated to a certain degree. The sealing ring has an annular projection or rib 10 extending axially outward from the body of the ring and is provided with a smooth flat surface 11 lying in a plane at right angles to the axis of the seal. The body of the ring also is provided with diametrically positioned ears 12 which are received in the pockets 8 to thus lock the ring to the disc and prevent any relative rotation between these two members.

Interposed between the bottom wall 7 of the recess and the bottom of the ring is a washer 13 which is made of non-metallic material having a characteristic which will prevent grease, such as hypoid grease, from passing through said material. The material which I prefer for this washer is leather but it also may be made of a synthetic rubber or a suitable fabric impregnated with substance to prevent it from being porous. The washer is of such radial width as to project beyond the inner edge of the disc and also the inner surface of the ring. If desired, a suitable glue may be employed to seal the washer to the wall 7 of the recess of the disc and to the sealing ring but this not a necessity since the ring and the washer will be maintained in the recess when the seal is in operation as will be later apparent.

Referring to Figure 3, I have shown my improved seal positioned for use in a vehicle rear axle construction to prevent grease from passing out of the bearing between the rear axle and the housing. The rear axle construction shown comprises an axle housing 14 which is formed with a flange 15 at its outer end. The axle 16 extends through the housing and drives the wheel hub 17 keyed to the axle. A bearing 18 of common construction is provided at the outer end of the housing and the axle and comprises a race 19 pressed in the end of the housing, a race 20 pressed on the axle, and a plurality of rollers 21 cooperating with the races. An inner seal 22 is sometimes employed to prevent differential oil or grease from reaching the bearing 18. This inner seal, however, may be eliminated entirely when my improved seal is used as it is efficient enough to retain the relatively thin differential grease or oil. The flange 15 of the housing carries the usual brake assembly backing plate 23 upon which the brake shoes 24 (one only being shown) are supported for cooperation with the brake drum (not shown) carried by the wheel.

The seal embodying my invention is positioned in this axle construction so as to be mounted on the axle housing with the sealing ring cooperating with the end surface 25 of the bearing race 20 rotatable with the axle 16, to thus prevent any grease from passing out of the housing 14. The seal, when placed in operative position, has the outer portion of the disc clamped between the backing plate 23 and a ring 26 by means of the bolts 27 which secure the backing plate to the axle housing flange 15. The seal is so proportioned and constructed that when the outer portion of the diaphragm is clamped in position, the flat surface 11 on the sealing ring will be held in pressure engagement with the flat surface 25 on the race 20. This pressure engagement is brought about by having the axial distance between the plane of the body of the disc and the surface 11 on the ring slightly greater than the axial distance between the surface of the backing plate engaged by the disc and the surface 25 of the bearing race. Thus, when the disc is clamped in position as shown, the outer portion of the disc and the inner portion of the disc will be flexed axially with respect to each other. Since the metal from which the disc is made is resilient, this flexing of the disc will cause the end surface 11 of the sealing ring to be held tightly against the end surface 25 of the race. The result is an efficient sealing action whereby grease cannot pass out of the bearing, notwithstanding the grease may be quite thin. This resilient flexing of the diaphragm also causes the washer 13 between the wall 7 of the disc and the sealing ring to be placed under pressure whereby the washer will act as a gasket and prevent any grease from passing between the ring and wall 7 of the disc.

The washer, in addition to having this sealing function, also has a very important function in assisting the operator to properly install the seal. As already pointed out, the washer projects beyond the inner edge of the diaphragm and the inner cylindrical surface of the seal. The inner diameter of this washer is preferably slightly less than the outer diameter of the axle 16. Thus, when the seal is placed in position (wheel hub removed), the sealing ring will be held concentric with the axle and the sealing surface 11 thereon in position to properly engage the flat surface 25 on the bearing race. There is no danger of the seal being so positioned during installation that any part of the sealing ring or disc will ride on the axle surface and be damaged as a result of play due to worn bearings.

Another important function of the washer 13 is that it acts as a dust seal when the seal is in operative position. Since the inner diameter of this washer is preferably slightly less than the diameter of the shaft, it will have slight pressure engagement with the shaft surface. Thus, dust and other foreign material will be kept from getting to the cooperating surfaces 11 and 25 and thereby readily cause rapid wear thereof whereby the sealing action would be impaired.

Although I have shown the washer 13 so positioned and of such material that it acts as a sealing gasket, a dust seal and a positioning means, it is possible, in accordance with my invention, to employ a washer of any suitable material (such as felt or cardboard) and so mount it on the disc that it will act only as a positioning means. Under such conditions, the inner diameter of the washer may be slightly greater than the diameter of the shaft as its primary function is to hold the disc and sealing ring spaced from the shaft during assembly.

By making the sealing ring of a carbon material such as graphite, this ring will produce a very efficient sealing action between the bearing race and the disc or diaphragm. Even if the end surface 24 of the race is not perfectly smooth, the relative movement between the surface 25 and the ring will very quickly result in the graphite filling in and smoothing the surface 25. As soon as the bearing surface is properly smoothed by rotation of the axle, the graphite will act as a lubricant between the sealing surfaces and there will be no serious wear on these surfaces even though the axle may rotate at a very high speed.

Being aware of the possibility of modifications in the particular structure herein described without departing from the fundamental principals of my invention, I do not intend that its scope be limited except as set forth by the appended claims.

Having fully described my invention, what I claim as new and desire to secure by Letters Patent of the United States is:

1. In a seal for cooperation with a rotatable shaft having thereon and rotatable therewith an annular flat surface lying in a plane at right angles to the axis of the rotatable member and with a fixed member through which the rotatable shaft extends to thus prevent lubricant from passing between the shaft and the fixed member, said seal comprising a one-piece thin metallic annular disc adapted to be positioned around the rotatable member and to have its peripheral portion detachably clamped to the fixed member, said disc having the material of its inner portion formed to provide an annular recess having a cylindrical wall and an inwardly extending end wall at substantially a right angle thereto, a sealing ring positioned in said recess and provided with an end surface lying in a plane at substantially right angles to the axis of the ring and adapted to have pressure engagement with the flat surface on the shaft when the seal is in operative position as a result of resilient flexing of the inner and outer portions of the disc relatively to each other, cooperating means on the disc and ring for preventing relative rotation, and a non-metallic sealing washer positioned between the ring and the end wall of the recess, said washer having such an inner diameter as to project beyond the inner edge of the disc and engage the cylindrical surface of the shaft to thus prevent dust or foreign material from reaching the sealing surfaces and to position the disc and sealing ring concentric with the shaft during assembly.

2. In a seal for cooperation with a rotatable shaft having thereon and rotatable therewith an annular flat surface lying in a plane at right angles to the axis of the rotatable member and with a fixed member through which the rotatable shaft extends to thus prevent lubricant from passing between the shaft and the fixed member, said seal comprising a one-piece thin metallic annular disc adapted to be positioned around the rotatable member and to have its peripheral portion detachably clamped to the fixed member, said disc having the material of its inner portion formed to provide a cylindrical wall having an axially extending pocket in its inner surface and an inwardly extending wall at substantially right angles thereto, a sealing ring positioned in said cylindrical wall and provided with an annular end surface lying in a plane at substantially right angles to the axis of the ring and adapted to have pressure engagement with the flat surface on the shaft when the seal is in operative position, said ring also having a radial projection for reception in the pocket, and a nonmetallic sealing washer positioned between and in direct engagement with the ring and the inwardly extending wall, said washer having such an inner diameter as to project beyond the inner edge of the disc and engage the cylindrical surface of the shaft.

NOEL S. REYNOLDS.